United States Patent
Shental (10) Patent No.: US 10,644,778 B2
(45) Date of Patent: May 5, 2020

(54) EFFICIENT LINEAR DETECTION IMPLEMENTATION FOR MASSIVE MIMO

(71) Applicant: Nokia Technologies Oy, Espoo (FI)

(72) Inventor: Ori Shental, Holmdel, NJ (US)

(73) Assignee: Nokia Technologies, Oy, Espoo (FI)

( * ) Notice: Subject to any disclaimer, the term of this patent is extended or adjusted under 35 U.S.C. 154(b) by 0 days.

(21) Appl. No.: 16/434,377

(22) Filed: Jun. 7, 2019

(65) Prior Publication Data

US 2020/0021348 A1 Jan. 16, 2020

(30) Foreign Application Priority Data

Jul. 13, 2018 (FI) .................................. 20185640

(51) Int. Cl.
| | | |
|---|---|---|
| H04K 1/10 | (2006.01) | |
| H04L 27/28 | (2006.01) | |
| H04B 7/06 | (2006.01) | |
| H04B 7/0456 | (2017.01) | |

(52) U.S. Cl.
CPC ......... *H04B 7/0634* (2013.01); *H04B 7/0473* (2013.01); *H04B 7/0478* (2013.01)

(58) Field of Classification Search
CPC .. H04B 7/0634; H04B 7/0473; H04B 7/0478; H04B 7/0413; H04L 25/0204; H04L 1/005; H04L 1/203; H04L 1/0618; H04L 1/02
USPC ................................. 375/260, 346, 340, 349
See application file for complete search history.

(56) References Cited

U.S. PATENT DOCUMENTS

| | | | | |
|---|---|---|---|---|
| 2004/0208254 | A1* | 10/2004 | Lee ........................ | H04L 1/0618 375/260 |
| 2007/0268981 | A1* | 11/2007 | Heiskala ................ | H04L 1/005 375/267 |
| 2007/0286312 | A1* | 12/2007 | Kim .................... | H04L 25/0204 375/340 |
| 2009/0279644 | A1* | 11/2009 | Maru ................... | H04B 7/0413 375/340 |
| 2016/0254883 | A1* | 9/2016 | Ma ........................ | H04L 1/203 375/267 |

(Continued)

OTHER PUBLICATIONS

Office action received for corresponding Finnish Patent Application No. 20185640, dated Mar. 8, 2019, 9 pages.

(Continued)

*Primary Examiner* — Phuong Phu
(74) *Attorney, Agent, or Firm* — Alston & Bird LLP (57) ABSTRACT

Per given time instance, K samples b are acquired from a signal r, which is based at least on K transmitted symbols x and a transfer matrix H of a communication channel, and a linear detection matrix A of a size K×K is acquired, which is based at least on the transfer matrix H (S101). For the K samples b and the linear detection matrix A, at most K(K−1) tentative parameters b˜ and at most K(K−1) tentative parameters A˜ are iteratively calculated (S102). It is checked whether or not the tentative parameters b˜ and A˜ have converged (S103). If b˜ and A˜ have converged, K estimation values xˆ are decided for the K transmitted symbols x based on b˜ and A˜ (S104). If b˜ and A˜ have not converged, it is returned to the iteratively calculating b˜ and A˜ for the K samples b.

20 Claims, 7 Drawing Sheets

(56) References Cited

U.S. PATENT DOCUMENTS

2017/0170928 A1* 6/2017 Liu .......................... H04L 1/02

OTHER PUBLICATIONS

Zhang et al., "Reviews of Recent Progress on Low-Complexity Linear Detection via Iterative Algorithms for Massive MIMO Systems", IEEE/CIC International Conference on Communications in China (ICCC Workshops), Jul. 27-29, 2016, 6 pages.
Tang et al., "Approximate Iteration Detection and Precoding in Massive MIMO", China Communications, vol. 15, No. 5, May 2018, pp. 183-196.
Guo et al., "Low-Complexity Signal Detection based on Relaxation Iteration Method in Massive MIMO Systems", China Communications, vol. 12, No. Supplement 1, Dec. 2015, pp. 1-8.
Juntti et al., "Iterative Implementation of Linear Multiuser Detection for Dynamic Asynchronous CDMA Systems", IEEE Transactions on Communications, vol. 46, No. 4, Apr. 1998, pp. 503-508.
Jin et al., "A Split Pre-Conditioned Conjugate Gradient Method for Massive MIMO Detection", IEEE International Workshop on Signal Processing Systems (SiPS), Oct. 3-5, 2017, 6 pages.
Liu et al., "A Signal Detection Algorithm Based on Chebyshev Accelerated Symmetrical Successive Over-Relaxation Iteration for Massive MIMO System", International Conference on Wireless Communications and Signal Processing (WCSP), Oct. 11-13, 2017, 6 pages.

* cited by examiner

| Algorithm | Initialization | Complex * | Complex + |
|---|---|---|---|
| Cholesky (Exact) | | $\frac{K^3}{6} + \frac{3}{2}K^2 + \frac{K}{3}$ | $\frac{K^3}{6} + K^2 - \frac{7}{6}K$ |
| Gauss-Seidel | $\hat{x}_0 = 0$ | $K^2 t_{max}$ | $K(K-1)t_{max}$ |
| Gauss-Seidel | $\hat{x}_0 = (D^{-1} - D^{-1}ED^{-1})b$ | $K^2 t_{max} + 3K^2 - K$ | $K(K-1)t_{max} + 2K^2 - K$ |
| Proposed | $\hat{x}_0 = 0$ | $2K^2 t_{max}$ | $2K(K-1)t_{max}$ |
| Proposed | $\hat{x}_0 = (D^{-1} - D^{-1}ED^{-1})b$ | $2K^2 t_{max} + 3K^2 - K$ | $2K(K-1)t_{max} + 2K^2 - K$ |

| Tx8Rx64 | | Parameter | | | |
|---|---|---|---|---|---|
| | | Area | Tput | HW Efficiency | SNR@10% BLER [dB] |
| Proposed Scheme versus | Exact (Cholesky) | -30% | +200% | 4x | +0.1 |
| | 2nd Best Efficient | -50% | 0% | 2x | -0.2 |

Fig. 8

| Tx32Rx256 | | Parameter | | | |
|---|---|---|---|---|---|
| | | Area | Tput | HW Efficiency | SNR@10% BLER [dB] |
| Proposed Scheme vs. | Exact (Cholesky) | -70% | +200% | 10x | +0.1 |
| | 2nd Best Efficient | -45% | 0% | 2x | -0.15 |

Fig. 10

| Tx32Rx128 | | Parameter | | | |
|---|---|---|---|---|---|
| | | Area | Tput | HW Efficiency | SNR@10% BLER [dB] |
| Proposed Scheme vs. | Exact (Cholesky) | -40% | +50% | 2.5x | 0 |
| | 2nd Best Efficient | +33% | +50% | 1.12x | -0.25 |

EFFICIENT LINEAR DETECTION IMPLEMENTATION FOR MASSIVE MIMO

TECHNICAL FIELD

Some embodiments relate to an efficient linear detection implementation for massive multi-input multi-output (MIMO).

BACKGROUND

Massive MIMO, also known as large-scale MIMO, is a scalable version of point-to-point MIMO, or multiuser MIMO, with many antennas at both link ends. Multiuser detection for massive MIMO relies on the implementation of linear signal processing schemes such as the zero-forcing (ZF) and the linear minimum mean-square-error (LMMSE) detectors.

An option for implementing the linear (e.g., LMMSE) receiver is via an exact implementation. The cheapest, computationally speaking, implementation of an exact linear procedure is based on the Cholesky decomposition, namely:
 1. First, decompose $A \triangleq LL^T$, where L is a lower triangular matrix.
 2. Next, solve Ly=b via forward substitution to extract the vector y.
 3. Finally, solve $L^T x = y$ by back substitution to extract the desired soft decision x*.

The main drawback of such an exact computation approach is in it being computationally-heavy, where the number of required operations is cubic with the number of transmitting antennas, which again may be large in massive MIMO applications. Another problem with this approach, deteriorating its hardware (HW) efficiency, is the fact that its pipeline latency is relatively large, since the Cholesky solver is based on a pipeline of 3 different stages (again the decomposition itself, forward and backward substitution) that must be performed sequentially, one after the other. Consequently, the supported data throughput, which is proportional to the latency reciprocal, is also limited.

A popular iterative alternative is based on the classical Gauss-Seidel (GS) method:

$$\hat{x}_{t+1} = (D+L)^{-1}(b - U\hat{x}_t),$$

where D, L, U are the diagonal, strictly lower triangular and strictly upper triangular matrices of the (LMMSE) matrix A, respectively.

SUMMARY

Some embodiments aim at providing an approximate scheme for executing linear detection, which is enhanced in terms of hardware efficiency and latency.

Some embodiments provide for an iterative approximate scheme for executing linear detection, involving matrix inversion (e.g. like LMMSE), in a massive MIMO environment.

According to some embodiments, a method, a computer program, a computer readable medium, a non-transitory computer readable medium and apparatuses are provided as defined in the appended claims.

The iterative scheme for an approximate implementation of the computationally-demanding linear multiuser detection in the massive MIMO configuration, according to some embodiments, shows attractive merits of hardware efficiency.

In the following the invention will be described by way of embodiments thereof with reference to the accompanying drawings.

DESCRIPTION OF THE EMBODIMENTS

First, the problem with multiuser detection for massive MIMO is described, for exposition purposes, in terms of an LMMSE detector, but evidently it is also applicable to other forms of linear detection, such as the implementation of the ZF detector, and any other linear detector (implicitly) involving matrix inversion.

Furthermore, the iterative scheme according to some embodiments is applied in the context of beamforming in the downlink.

Consider a generic uplink wireless massive MIMO channel with K transmitting antennas (e.g., users, transmitting units) and M receiving antennas at the base-station (or alternatively M antenna receptions aggregated together at a central baseband unit (BBU) location).

The system load is defined as $$\beta \triangleq \frac{K}{M} \leq 1$$

and typically in underloaded massive MIMO $\beta \ll 1$. Assume a flat fading channel and Additive White Gaussian Noise (AWGN) (with variance $\sigma^2$):

$$r \triangleq [r_1, \ldots, r_M]^T = \begin{bmatrix} h_{11} & \cdots & h_{1K} \\ \vdots & \ddots & \vdots \\ h_{M1} & \cdots & h_{MK} \end{bmatrix} \begin{bmatrix} x_1 \\ \vdots \\ x_K \end{bmatrix} + n = Hx + n$$

where vector r represents a signal received at the M receiving antennas (receiving units), $h_{i,j}$ represents entries of transfer matrix H, with i=1 ... K and j=1 ... M, vector x represents K transmitted symbols transmitted by the transmitting units, and vector n represents noise.

The LMMSE receiver in such a setup boils down to the linear operation:

$$\hat{x}=(H^TH+\sigma^2 I_K)^{-1}H^T r$$

where vector $\hat{x}$ represents K estimation values for the K transmitted symbols, and $I_K$ is an identity matrix.

Note that this LMMSE operation is equivalent to solving a linear system of the form:

$$\underbrace{(R+\sigma^2 I_K)}_{A}\underbrace{\hat{x}}_{x^*}=\underbrace{H^T r}_{b},$$

where $R \triangleq H^T H$ is the channel's Gram matrix, A is the (LMMSE) matrix, to be implicitly inverted, and b is the matched-filter output. The vector $x^*$ is the desired solution to this set of linear equations.

Figure 1:
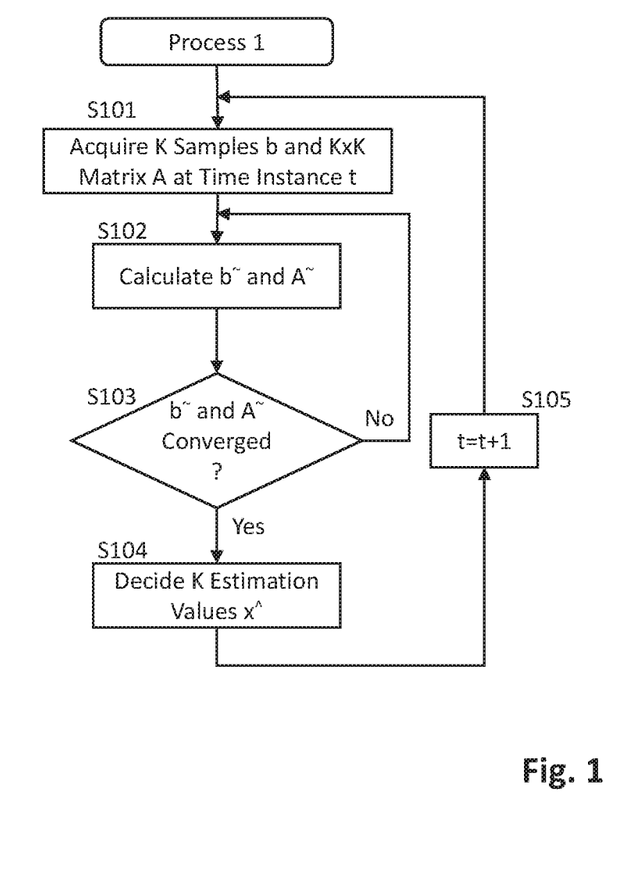
FIG. 1 shows a flowchart illustrating a process 1 according to some embodiments.

FIG. 1 shows a flowchart illustrating a process 1 of an iterative scheme for linear detection in a massive MIMO system according to some embodiments.

In process 1, in step S101, at a time instance t, K samples b are acquired from a signal r, wherein r is based at least on K transmitted symbols x and a transfer matrix H of a communication channel. Further, in step S101, at time instance t, a linear detection matrix A of a size K×K is acquired, which is based at least on the transfer matrix H. According to an example implementation, the signal r is received from K transmitting units. Alternatively or in addition, the K samples b are received from a preceding matched filter module. It is noted that b, r and x may be vectors corresponding to those as described above.

In step S102, at most K(K−1) tentative parameters b˜ and at most K(K−1) tentative parameters A˜ are calculated for the K samples b and the linear detection matrix A. According to an example implementation, the linear detection matrix A comprises a linear minimum mean-square-error detection matrix as described above, zero forcing detection matrix, or any other linear detection matrix.

According to an example implementation, calculation of b˜ and A˜ implicitly involves approximating a matrix inversion of the linear transfer matrix A.

According to an example implementation, calculation of b˜ and A˜ comprises an initialization in which the K samples b and the K×K linear detection matrix A are used as inputs.

In step S103, it is checked whether or not the tentative parameters b˜ and A˜ have converged according to a pre-defined stopping criterion.

If b˜ and A˜ have converged (Yes in S103), process 1 proceeds to step S104 in which, based on b˜ and A˜, K estimation values x^ are decided for the K transmitted symbols x. Then, process 1 advances to step S105 in which the time instance t is incremented, and then again to step S101 in which K samples b and a K×K linear detection matrix A of the next time instance are acquired.

On the other hand, if b˜ and A˜ have not converged (No in S103), process 1 returns to step S102.

According to an alternative example implementation, calculation of b˜ and A˜ comprises an initialization in which the K samples b are replaced with b−A$\hat{x}_{t=0}$, wherein the decision in step S104 comprises adding the K estimation values x^ to $\hat{x}_{t=0}$, with $\hat{x}_{t=0}=(D^{-1}-D^{-1}ED^{-1})$b, where D and E are the diagonal and complementary off-diagonal matrices of the linear transfer matrix A, respectively.

It is noted that process 1 may be terminated e.g. in case there are no more samples b to acquire, after a predetermined time period, etc.

The above-described process 1 provides for a recipe for hardware (HW)-efficient implementations of multiuser linear detection (as the above LMMSE receiver) in massive MIMO applications, which is of importance for the design of attractive and cost-effective 5G and beyond systems.

Hardware efficiency refers, among others, to the following aspects:
Significantly less FLOPs (floating-point operations) than a straightforward exact implementation which is by nature cubic with the number of transmitting antennas K;
Less silicon area (reduced bill of materials (BoM));
Reduced computation (pipeline) latency;
Support of higher data throughput in the HW pipeline;
Seamlessly lending itself to parallel computation resources implementation (e.g., either within the same HW entity or distributed across several HW entities connected via a fast bus);
Having a minimal number of iterations which entail maximal effectiveness in detection;
Enabling HW reuse via scheme iterations; and
All the above, at the expense of negligible performance loss.

The approximate scheme illustrated in FIG. 1 for executing linear detection, involving matrix inversion (like LMMSE), in a massive MIMO environment provides for the following benefits:
Faster convergence, typically 3 times faster in the examined practical configurations (as described later on);
Moreover, for typical massive MIMO underloads, only 1, or 2 iterations of the proposed scheme are required in order to infer soft decisions which are sufficiently close, in their accuracy, to the output of an exact (and costly) implementation of the linear detector;
The complexity per iteration, in FLOPs, of the scheme of process 1 is less than 3 times larger than that of other iterative scheme alternatives, thus yielding an overall computational gain;
Following its accelerated convergence property, the scheme of process 1 suggests a reduced pipeline latency, and consequently a higher supported throughput, compared to the exact Cholesky-based scheme and other iterative schemes, as the one based on GS;
The scheme of process 1 inherently lends itself to parallel computation resources implementation;
In terms of the hardware efficiency, measured via the metric of the product of FLOPs×latency, which is also proportional to the ratio area/throughput, the scheme of process 1 is found to be superior to the exact Cholesky implementation and the iterative implementation alternatives (the lesser this above-mentioned product, or ratio, the more efficient the HW); and
All the above is conveyed in practical massive MIMO configurations at the expense of only 0.1 dB loss in the SNR achieving 10% block-error-rate (BLER).

Figure 2:
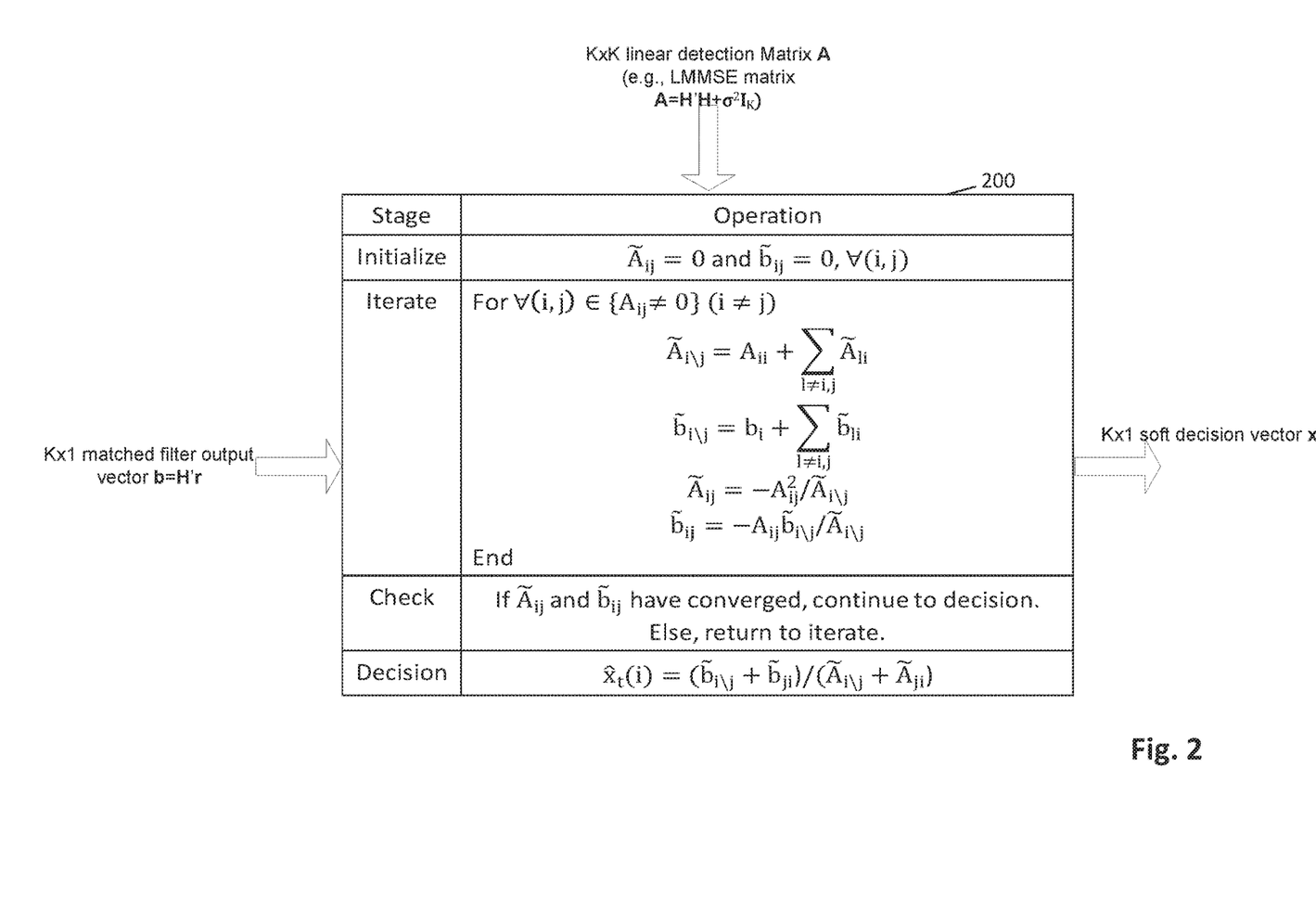
FIG. 2 shows a diagram illustrating a scheme for linear detection according to an example implementation.

FIG. 2 shows a diagram illustrating an example implementation of the scheme of process 1 for linear detection in a massive MIMO system.

Per K transmitted symbols at a given time instance, inputs into the proposed linear detector implementation (module 200) are:
(1) a K×1 vector of samples received from a preceding matched filter module; and (2) a K×K linear detection matrix A (which is for instance in the LMMSE detector case A=(H'H+σ²I$_K$)). The module 200 outputs a K×1 vector of soft decisions, x̂, estimating the desired K transmitted symbols.

In the module 200, first, in a step "initialize" for all i and j (i=1 ... K, j=1 ... K, and j≠i), $\tilde{A}_{ij}$ and $\tilde{b}_{ij}$ are initialized to zero. $\tilde{A}_{ij}$ are entries (tentative parameters) of $\tilde{A}$, and $\tilde{b}_{ij}$ are entries (tentative parameters) of $\tilde{b}$.

Then, in a step "iterate", for all i and j corresponding to non-zero entries of the linear detection matrix A, calculations are performed as illustrated in FIG. 2. In particular, tentative values for the parameters $\tilde{A}_{ij}$ and $\tilde{b}_{ij}$, are calculated for A and b, and based on these tentative values and based on b and A, $\tilde{A}_{ij}$ and $\tilde{b}_{ij}$ are calculated. In other words, tentative parameters corresponding to different combinations of i and j are calculated.

Then, in a step "check", it is checked whether or not $\tilde{A}_{ij}$ and $\tilde{b}_{ij}$ have converged according to some predefined criterion. In case $\tilde{A}_{ij}$ and $\tilde{b}_{ij}$ have converged, the process in module 200 continues to a step "decision". Otherwise, the process returns to "iterate".

In the step "decision", $\hat{x}_t(i)$ is calculated as:

$$\hat{x}_t(i)=(\tilde{b}_{ij}+\tilde{b}_{ji})/(\tilde{A}_{ij}+\tilde{A}_{ji})$$

According to an example implementation, a first initialization option for the above-described iterative scheme comprises a naïve (yet cheap) approach setting: $\hat{x}_{t=0}=0$. In other words, b and A are taken as inputs to the process of FIG. 2.

According to another example implementation, a second initialization option for the above-described iterative scheme comprises a calculated (thus "smarter") initialization which is a bit pricy: $\hat{x}_{t=0}=(D^{-1}-D^{-1}ED^{-1})b$, where D, E are the diagonal and complementary off-diagonal matrices of the matrix A, respectively. This initialization means replacing the vector b with b−A$\hat{x}_{t=0}$ where $\hat{x}_{t=0}$ is defined as indicated above, and in the step "decision" adding the estimated $\hat{x}_t$ to $\hat{x}_{t=0}$ to get the approximated value. The second initialization option, which expedites convergence compared to the zero initialization, is based on a 2-term Neumann series expansion (NSE).

Figure 3:
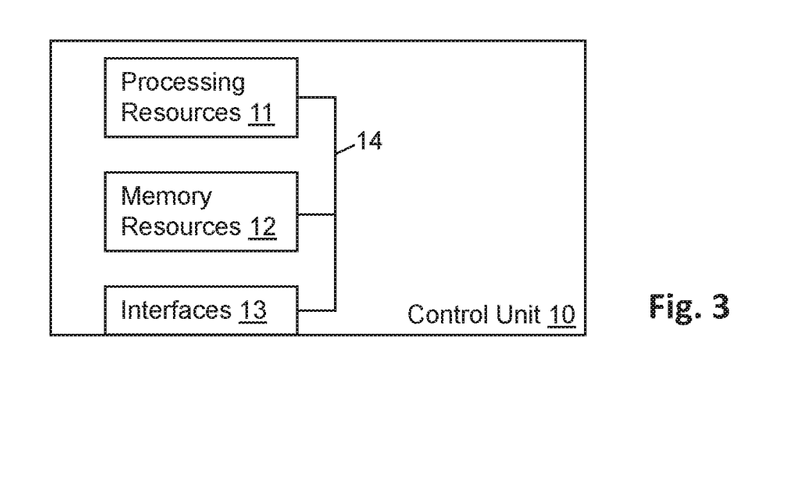
FIG. 3 shows a schematic block diagram illustrating a configuration of a control unit in which examples of embodiments are implementable.

FIG. 3 shows a schematic block diagram illustrating a configuration of a control unit 10 in which examples of embodiments are implementable. The control unit 10 comprises processing resources (processing circuitry) 11, memory resources (memory circuitry) 12 and interfaces (interface circuitry) 13, coupled by a connection (e.g. a bus) 14.

According to an example implementation, the control unit 10 executes process 1 shown in FIG. 1.

According to another example implementation, the control unit 10 implements the module 200 of FIG. 2.

According to some embodiments, the control unit 10 is implemented in a base station of a communication system (comprising 3G, 4G and 5G systems) and/or is used for baseband processing, and/or is implemented in access points or handsets, and/or is used for wireless communication.

According to some embodiments, the processing resources (processing circuitry) 11, memory resources (memory circuitry) 12 and interfaces (interface circuitry) 13 function as acquiring means implementing step S101, calculating means implementing step S102, checking means and returning means, implementing step S102, and deciding means implementing step S104.

The memory resources (memory circuitry) 12 may store a program that is assumed to include program instructions that, when executed by the processing resources (processing circuitry) 11, enable the electronic device to operate in accordance with the exemplary embodiments. In general, the various embodiments may be implemented in hardware or special purpose circuits, software (a computer program comprising computer readable instructions, computer readable instructions embodied on a computer readable medium e.g. comprising a non-transitory computer readable medium), logic or any combination thereof.

Further, as used in this application, the term "circuitry" refers to all of the following:
(a) hardware-only circuit implementations (such as implementations in only analog and/or digital circuitry) and
(b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and
(c) to circuits, such as a microprocessor(s) or a portion of a microprocessor(s), that require software or firmware for operation, even if the software or firmware is not physically present.

This definition of "circuitry" applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Figure 4:
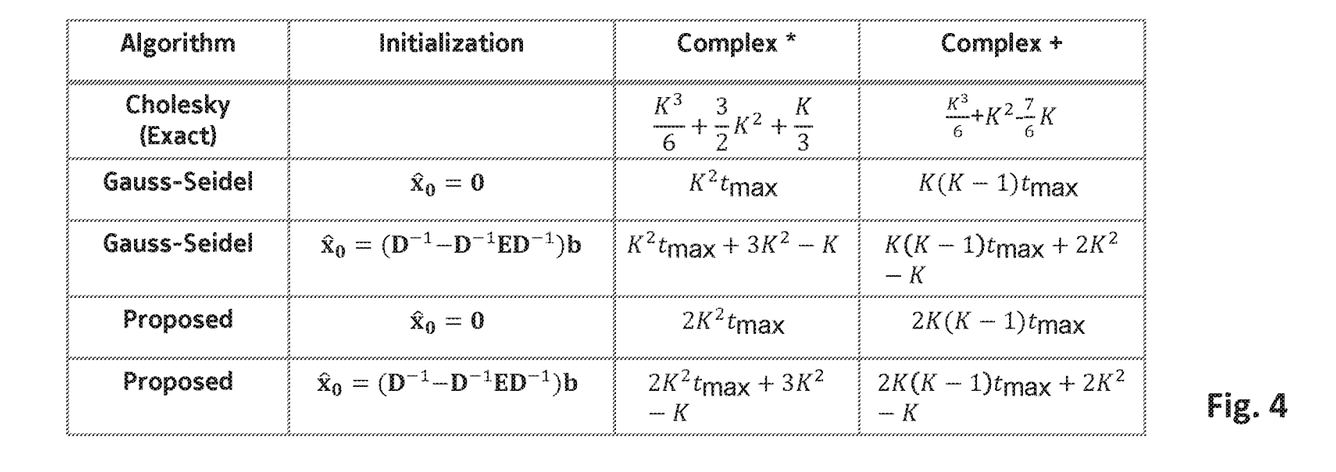
FIG. 4 shows a table comparing MAC operations of examined schemes for linear detection.

Now reference is made to FIG. 4 showing a table comparing the number of complex "multiply and accumulate" (MAC) operations of examined schemes with the above-described two different initializations.

It is noted that, as for other off-the-shelf iterative schemes, GS-based implementation is observed, in the massive MIMO setup simulations, to converge faster than a conjugate gradient least-squares (CGLS) based scheme, thus it was chosen as the method of reference for iterative schemes in the comparison.

On the first row of the table there is the exact Cholesky implementation with its cubic order number of complex multiplications and additions. Note that this number sums up the operations for the 3 stages of the Cholesky scheme (decomposition, forward substitution and backward substitution).

Next, there is the GS iterative scheme with $t_{max}$ iterations and a 0-vector initialization. This setup has the least number of complex multiplications or additions per iteration which is K squared. The calculated initialization of GS naturally entails some overhead in operations, but also speeds up its convergence. In the next two rows there is the required number of complex multiplications and additions needed for the proposed iterative scheme with a naïve 0 initialization and the calculated initialization. Both are quadratic with the number of transmitting antennas or users K.

In order to evaluate and compare the HW efficiency of the proposed scheme to its alternatives, in the following analysis it is assumed that:

Each complex multiplication yields 4 real multiplications and 2 real additions;
Each complex addition boils down to 2 real additions; and
The number of FLOPs is defined as the sum of the required number of real multiplications and additions.

A massive MIMO uplink with LMMSE detection in a Rayleigh channel where each user's information data is encoded with a rate 1/2 LDPC code and modulated using a 64-QAM constellation has been simulated. A perfect channel estimation at the receiver side is assumed and it is focused on the operational point of 10% BLER. In the comparison, only approximate detector setups are considered which yield less than 0.3 dB degradation at the 10% BLER reference point w.r.t. the exact LMMSE.

For evaluating the HW efficiency, the product out of the number of FLOPs and the latency is of interest, which is, again, also proportional to the ratio between the required silicon area (viz., number of look-up table (LUT) in field programmable gate array (FPGA)) for implementation and the supported throughput. Hence, the lesser this product, the more efficient is the HW required by the corresponding LMMSE implementation. That is, for a given silicon area higher throughput is supported or alternatively for a given throughput rate a lower silicon area is required.

First Simulation Case: Tx8Rx64

Figure 5:
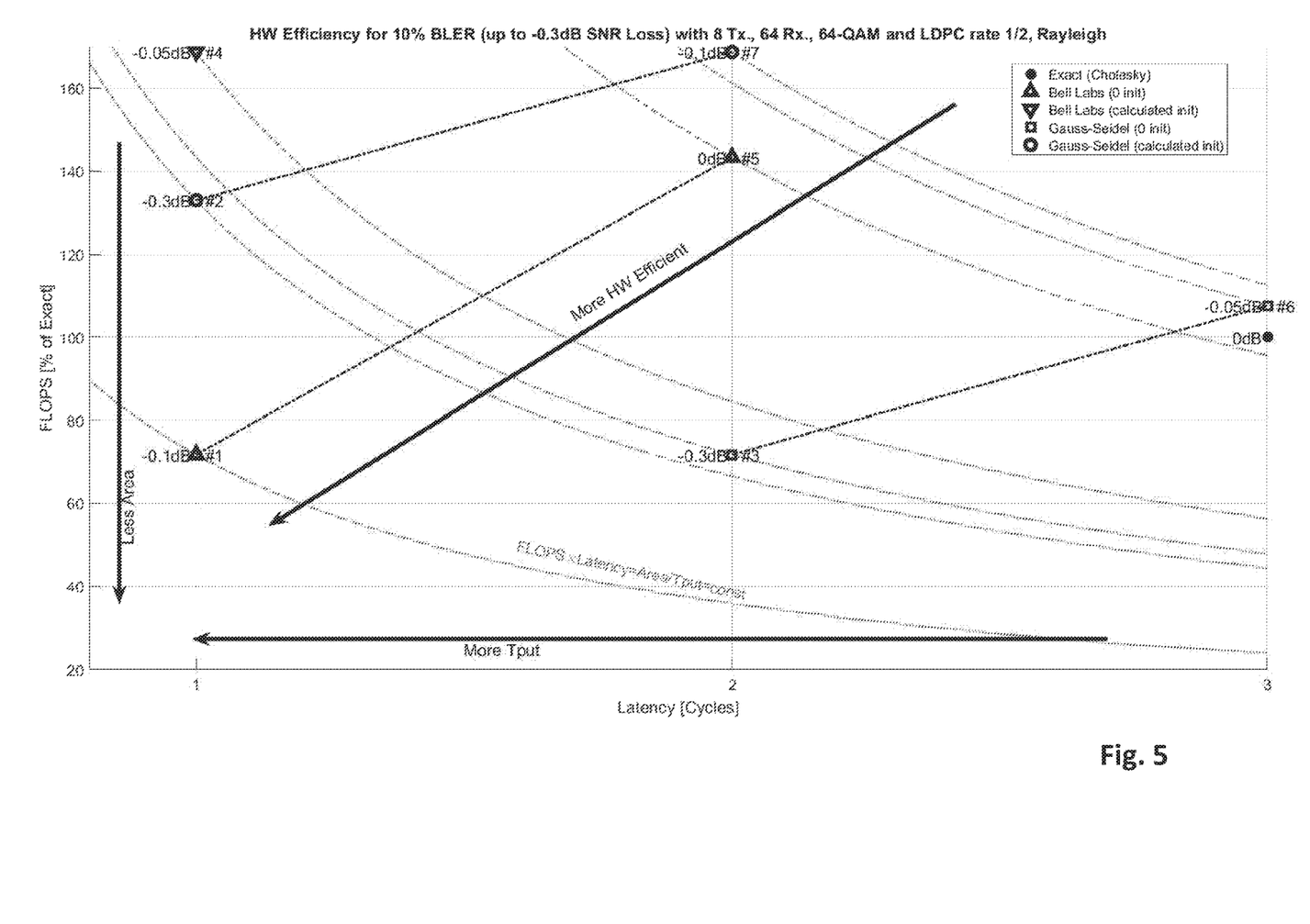
FIG. 5 shows a diagram illustrating simulation results in a first case of K=8 transmitting units and M=64 receiving units.

The first simulation setup examined is for the case of K=8 transmitting users or streams (transmitting units) and M=64 receiving antennas (receiving units). Simulation results are shown in FIG. 5.

The HW efficiency is evaluated via the following exposition: The y-axis in FIG. 5 marks the relative number of FLOPs, in percentage, w.r.t. the number of operations required to implement the exact Cholesky-based LMMSE. The x-axis denotes the HW latency in cycles or stages. The gray dotted contour lines mark the points in the FLOP-Latency plane sharing the same product of FLOPs and latency (or alternatively a fixed ratio between area and throughput). Hence, it is desired to choose an implementation method to be as close as possible to the Cartesian origin of FIG. 5, thus yielding less required area, more throughput, and overall being more HW efficient.

The black circle point denotes the latency and FLOPs required by the Cholesky exact LMMSE implementation. As stated in the previous MAC operations table, the number of FLOPs is cubic with the number of users, and also the latency is relatively large, since the Cholesky solver is based on a pipeline of 3 different consecutive stages. Next to each approximate scheme marker in FIG. 5, the scheme's degradation, or loss, compared to the exact implementation at the 10% BLER operational point of interest is labelled. Using labels "#", the different schemes are ordered according to their HW efficiency.

The most efficient scheme observed is the proposed iterative detector with a simple zero initialization (represented by "Δ"), which yields a performance loss of only 0.1 dB compared to the exact LMMSE performance. Note that this is achieved after only 1 iteration. The 2nd best HW efficient detector is the GS with the calculated initialization (the black circle), which yields a 0.3 dB degradation after 1 iteration. Then comes the GS with naïve 0 initialization (black square) at the cost of 0.3 dB, and next in line is the proposed detector with the calculated initialization, at a cost as minimal as 0.05 dB. The 5th efficient scheme is the proposed scheme with 0 initialization but allowing 2 iterations, which yield practically the same performance as the exact implementation. Next, is the GS with 0 initialization and 3 iterations (−0.05 dB), and finally the GS detector with 2 iterations and a calculated init (−0.1 dB).

The dashed lines in the figure illustrate the evolution in the FLOPs-Latency plain of the different scheme when one increases or reduces the number of allowed iterations. Please note that in this particular massive MIMO configuration, a method can require more FLOPs (even than that of the 100% corresponding to the exact scheme), but still be considered as more HW efficient since its pipeline latency may be shorter, thus potentially enable more throughput.

Figure 6:
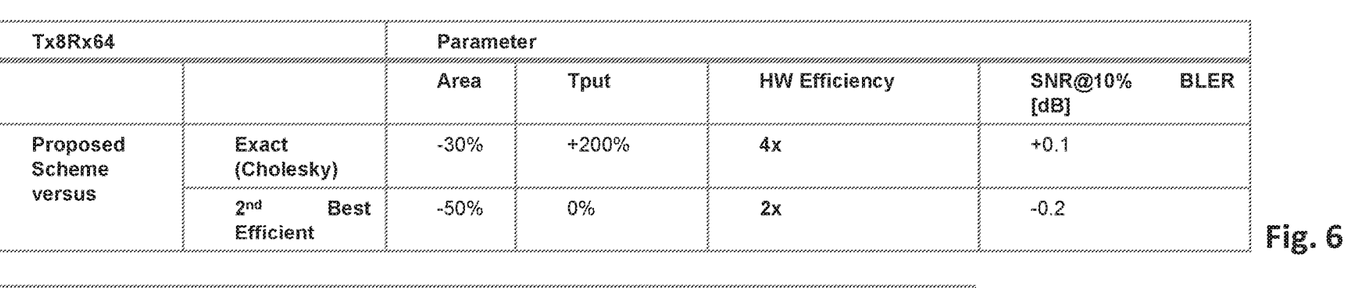
FIG. 6 shows a table illustrating comparison results of the first case.

To summarize and enumerate the plot shown in FIG. 5 for the Tx8Rx64 case, the proposed scheme is compared to the exact implementation and to the 2nd best efficient scheme in the table shown in FIG. 6.

As shown in FIG. 6, compared to the Cholesky-based scheme, the proposed scheme achieves 30% area reduction, 200% more supported throughput and overall the proposed detector is 4 times more HW efficient than the cheapest exact implementation, and all that at the expense of only 0.1 dB higher SNR to achieve 10% BLER. Comparing to the 2nd best iterative scheme, the proposed scheme achieves a 50% area reduction, the same supported throughout, 2 times more HW efficiency and an also improving the achieving SNR by 0.2 dB.

Second Simulation Case: Tx32Rx256

Figure 7:
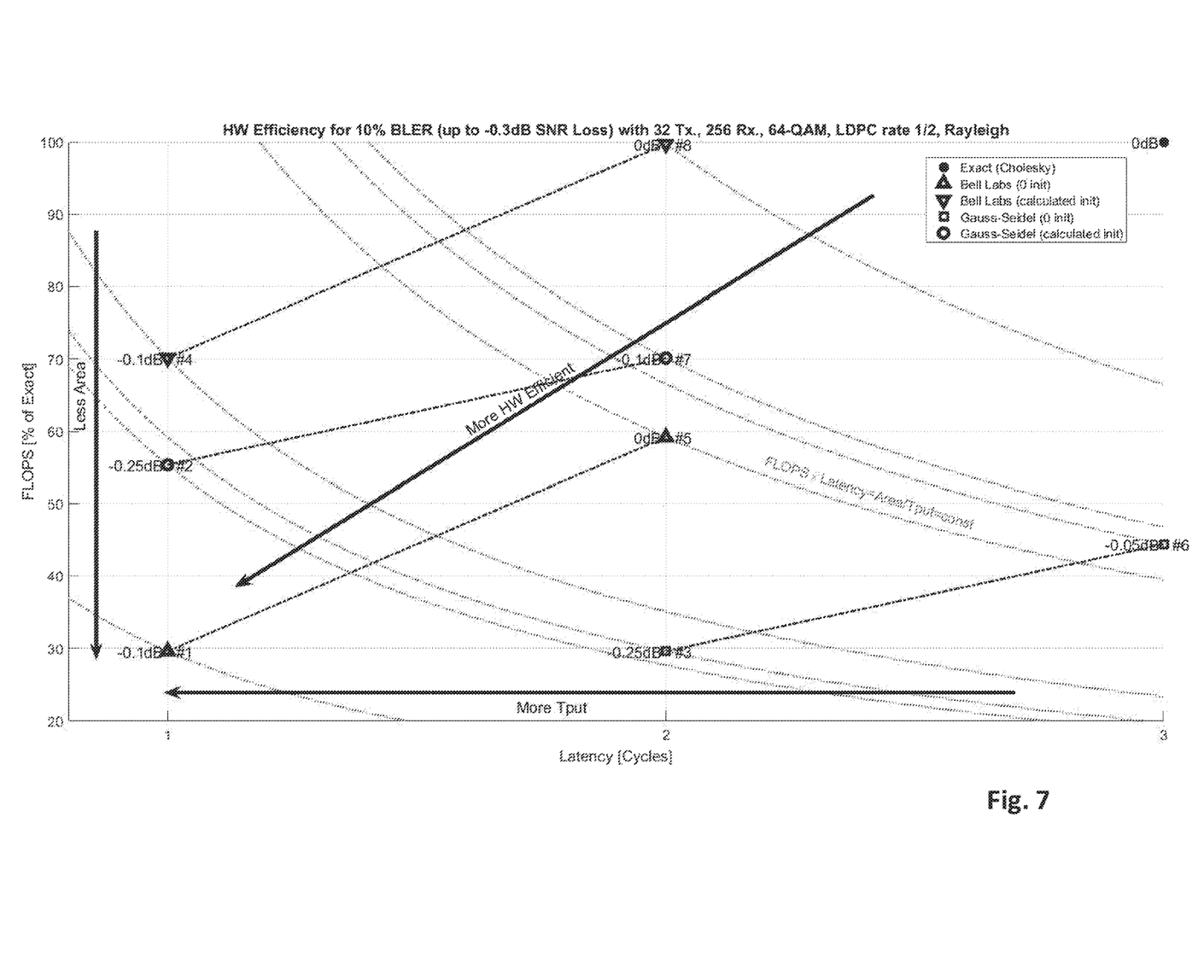
FIG. 7 shows a diagram illustrating simulation results in a second case of K=32 transmitting units and M=256 receiving units.

Now a massive MIMO configuration is considered which comprises the same load but more transmitting users, namely Tx32Rx256. Simulation results are shown in FIG. 7.

Again, the proposed scheme is observed as the most efficient at the expense of only 0.1 dB degradation, with GS (calculated initialization) after 1 iteration as the 2nd best (but −0.25 dB loss). Note also that for K=32 users, as opposed to the previous K=8 users case, all the examined methods, achieving up to 0.3 dB performance loss, still exhibit a total number of FLOPs reduction, that is all the markers reside below the 100% y-axis line.

Figure 8:
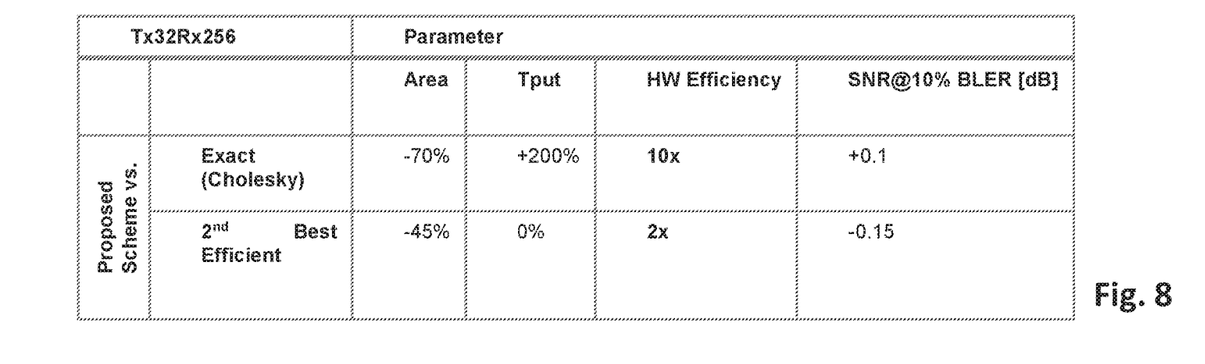
FIG. 8 shows a table illustrating comparison results of the second case.

The table shown in FIG. 8 enumerates the results in this case.

The proposed detector for 32 transmitters vs. 256 receiving antennas configuration, when compared to the exact alternative, reduces the required area by 70%, increases the supported throughput by 200% and overall enables a 10× improvement in the HW efficiency at the cost of only 0.1 dB SNR loss at the working point. Compared to the 2nd best scheme, 45% less FLOPs, or area, the same supported throughput and 2× the efficiency are achieved, including a 0.15 dB gain in SNR.

Third Simulation Case: Tx32Rx128

Figure 9:
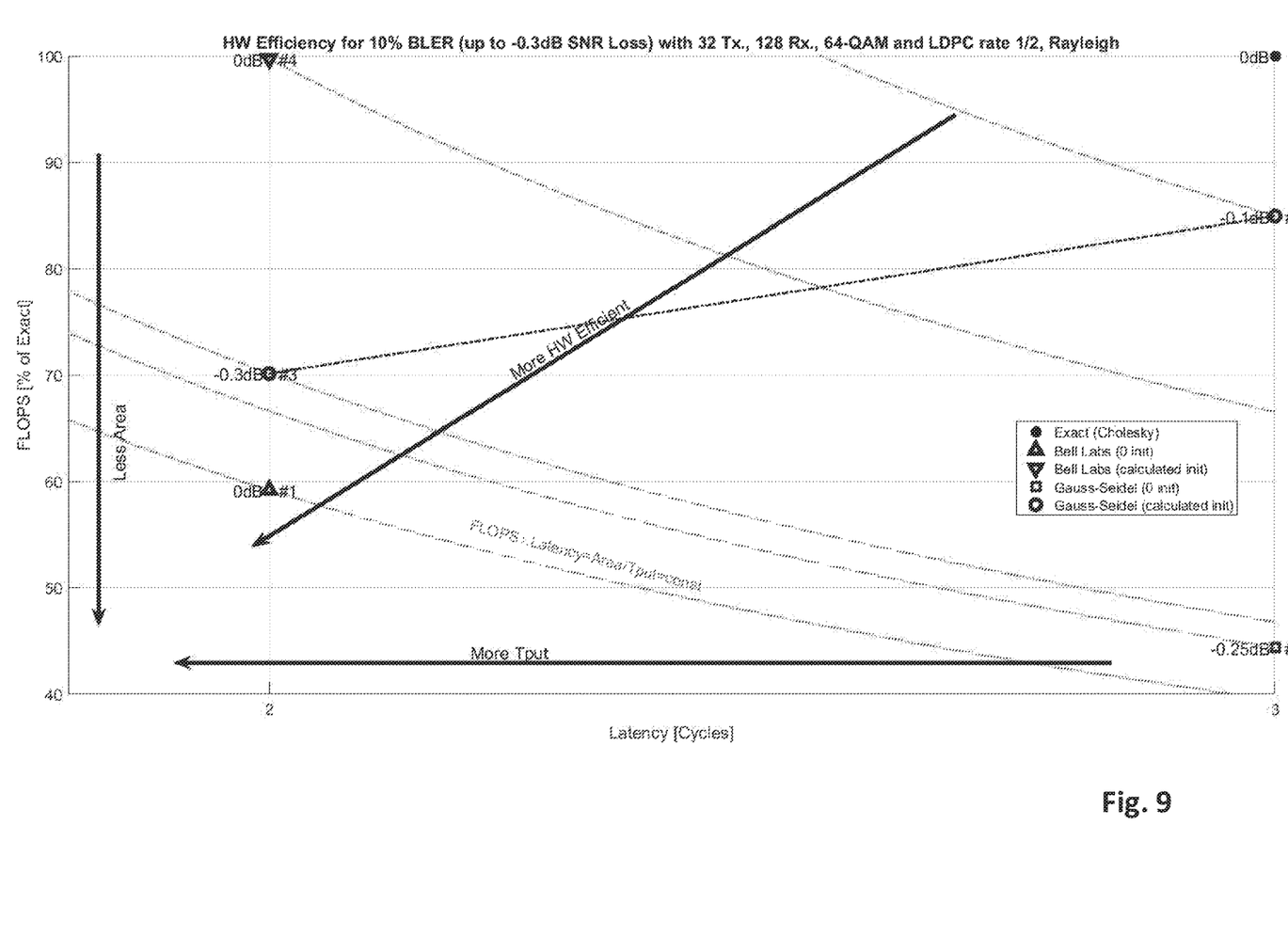
FIG. 9 shows a diagram illustrating simulation results in a third case of K=32 transmitting units and M=128 receiving units.

In the third examined setup being simulated, the number of transmitters is kept (that is K=32), but the load is doubled, that is having only M=128 receiving antennas. Simulation results are shown in FIG. 9.

Again, the proposed detector with a naïve initialization yields the most efficient implementation followed in this case by a 0-init GS which allows 3 iterations.

Figure 10:
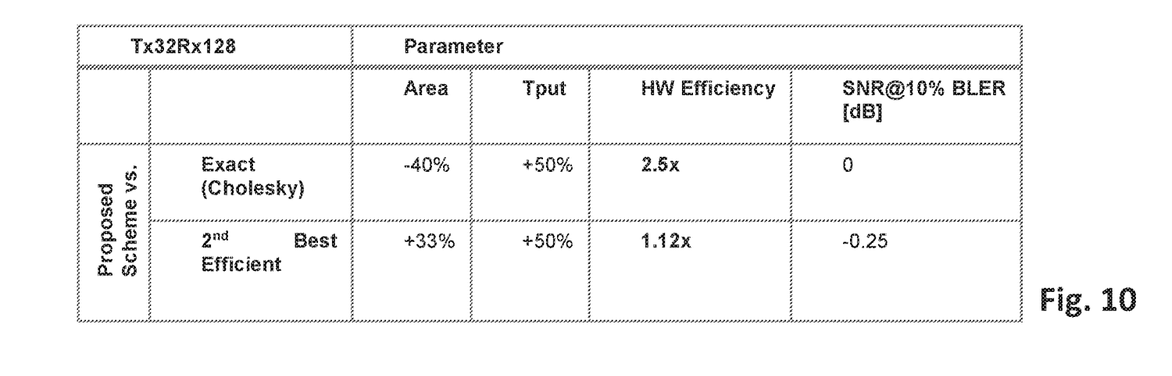
FIG. 10 shows a table illustrating comparison results of the third case.

The table shown in FIG. 10 quantifies the above results, for K=32 and load β=0.25.

As shown in FIG. 10, in this case, the proposed scheme achieves a 40% reduction in silicon area, 50% more throughput and an overall 2.5× more efficient implementation, when compared to exact LMMSE. Note that this time there is even practically no penalty in SNR to be paid (0 dB). Compared to the 2nd best option in this case, the proposed scheme achieves an increase in the area of 33%, but a 50% higher supported throughput, thus an overall 1.12×HW efficiency improvement, while still decreasing the achieving SNR by 0.25 dB.

It is to be understood that the above description is illustrative of the invention and is not to be construed as limiting the invention. Various modifications and applications may occur to those skilled in the art without departing from the true spirit and scope of the invention as defined by the appended claims.

The invention claimed is:

1. A method comprising:
   per given time instance, acquiring K samples b from a signal r, which is based at least on K transmitted symbols x and a transfer matrix H of a communication channel, and a linear detection matrix A of a size K×K, which is based at least on the transfer matrix H;
   iteratively calculating at most K(K−1) tentative parameters $\tilde{b}$ and at most K(K−1) tentative parameters $\tilde{A}$ for the K samples b and the linear detection matrix A;
   checking whether or not the tentative parameters $\tilde{b}$ and $\tilde{A}$ have converged;
   if $\tilde{b}$ and $\tilde{A}$ have converged, deciding K estimation values $\hat{x}$ for the K transmitted symbols x based on $\tilde{b}$ and $\tilde{A}$; and
   if $\tilde{b}$ and $\tilde{A}$ have not converged, returning to the iteratively calculating $\tilde{b}$ and $\tilde{A}$ for the K samples b.

2. The method of claim 1, the iteratively calculating $\tilde{b}$ and $\tilde{A}$ comprising approximating a matrix inversion of the linear transfer matrix A.

3. The method of claim 1, the iteratively calculating $\tilde{b}$ and $\tilde{A}$ comprising calculating approximate values of the K transmitted symbols x.

4. The method of claim 1, comprising:
   initializing the iteratively calculating $\tilde{b}$ and $\tilde{A}$ by using the K samples b and the K×K matrix A as inputs.

5. The method of claim 1, comprising:
   initializing the iteratively calculating $\tilde{b}$ and $\tilde{A}$ by replacing the K samples b with $b - A\hat{x}_{t=0}$,
   wherein the deciding comprises adding the K estimation values $\hat{x}$ to $\hat{x}_{t=0}$, with $\hat{x}_{t=0} = (D^{-1} - D^{-1}ED^{-1})b$,
   where D and E are the diagonal and complementary off-diagonal matrices of the linear transfer matrix, respectively.

6. The method of claim 1, wherein the linear detection matrix A comprises a linear minimum mean-square-error detection matrix and zero forcing detection matrix.

7. The method of claim 1, comprising:
   receiving the signal r from K transmitting units.

8. The method of claim 1, comprising:
   receiving the K samples b from a preceding matched filter module.

9. A non-transitory computer readable medium comprising program instructions for causing an apparatus to perform at least the following:
   per given time instance, acquiring K samples b from a signal r, which is based at least on K transmitted symbols x and a transfer matrix H of a communication channel, and a linear detection matrix A of a size K×K, which is based at least on the transfer matrix H;
   iteratively calculating at most K(K−1) tentative parameters $\tilde{b}$ and at most K(K−1) tentative parameters $\tilde{A}$ for the K samples b and the linear detection matrix A;
   checking whether or not the tentative parameters $\tilde{b}$ and $\tilde{A}$ have converged;
   if $\tilde{b}$ and $\tilde{A}$ have converged, deciding K estimation values $\hat{x}$ for the K transmitted symbols x based on $\tilde{b}$ and $\tilde{A}$; and
   if $\tilde{b}$ and $\tilde{A}$ have not converged, returning to the iteratively calculating $\tilde{b}$ and $\tilde{A}$ for the K samples b.

10. The non-transitory computer readable medium of claim 9, the iteratively calculating $\tilde{b}$ and $\tilde{A}$ comprising approximating a matrix inversion of the linear transfer matrix A.

11. The non-transitory computer readable medium of claim 9, the iteratively calculating $\tilde{b}$ and $\tilde{A}$ comprising calculating approximate values of the K transmitted symbols x.

12. The non-transitory computer readable medium of claim 9, comprising program instructions for causing the apparatus to further perform the following:
   initializing the iteratively calculating $\tilde{b}$ and $\tilde{A}$ by using the K samples b and the K×K matrix A as inputs.

13. The non-transitory computer readable medium of claim 9, comprising program instructions for causing the apparatus to further perform the following:
   initializing the iteratively calculating $\tilde{b}$ and $\tilde{A}$ by replacing the K samples b with $b - A\hat{x}_{t=0}$,
   wherein the deciding comprises adding the K estimation values $\hat{x}$ to $\hat{x}_{t=0}$, with $\hat{x}_{t=0} = (D^{-1} - D^{-1}ED^{-1})b$,
   where D and E are the diagonal and complementary off-diagonal matrices of the linear transfer matrix, respectively.

14. An apparatus comprising at least one processor and at least one memory including computer program code, the at least one memory and the computer program code configured to, with the at least one processor, cause the apparatus to perform at least the following:
   per given time instance, acquiring K samples b from a signal r, which is based at least on K transmitted symbols x and a transfer matrix H of a communication channel, and a linear detection matrix A of a size K×K, which is based at least on the transfer matrix H;
   iteratively calculating at most K(K−1) tentative parameters $\tilde{b}$ and at most K(K−1) tentative parameters $\tilde{A}$ for the K samples b and the linear detection matrix A;
   checking whether or not the tentative parameters $\tilde{b}$ and $\tilde{A}$ have converged;
   if $\tilde{b}$ and $\tilde{A}$ have converged, deciding K estimation values $\hat{x}$ for the K transmitted symbols x based on $\tilde{b}$ and $\tilde{A}$; and
   if $\tilde{b}$ and $\tilde{A}$ have not converged, returning to the iteratively calculating $\tilde{b}$ and $\tilde{A}$ for the K samples b.

15. The apparatus of claim 14, wherein the calculating is configured to
   approximate a matrix inversion of the linear transfer matrix A, and/or
   calculate approximate values of the K transmitted symbols x.

16. The apparatus of claim 14, wherein the calculating is configured to initialize the iterative calculation of $\tilde{b}$ and $\tilde{A}$ by using the K samples b and the K×K matrix A as inputs.

17. The apparatus of claim 14, wherein
   the calculating is configured to initialize the iterative calculation of $\tilde{b}$ and $\tilde{A}$ by replacing the K samples b with $b - A\hat{x}_{t=0}$; and
   the deciding is configured to add the K estimation values $\hat{x}$ to $\hat{x}_{t=0}$, with $\hat{x}_{t=0} = (D^{-1} - D^{-1}ED^{-1})b$,
   where D and E are the diagonal and complementary off-diagonal matrices of the linear transfer matrix, respectively.

18. The apparatus of claim 14, wherein the linear detection matrix A comprises a linear minimum mean-square-error detection matrix and zero forcing detection matrix.

19. The apparatus of claim 14, wherein the acquiring is configured to
   receive the signal r from K transmitting units, and/or
   receive the K samples b from a preceding matched filter module.

20. The apparatus of claim 14, wherein the apparatus is implemented in a base station of a communication system, and/or is used for baseband processing, and/or is implemented in access points or handsets, and/or is used for wireless communication.

* * * * *